(12) United States Patent
Kashyap et al.

(10) Patent No.: US 9,378,634 B1
(45) Date of Patent: Jun. 28, 2016

(54) LEVERAGING NEIGHBORS' WIRELESS ACCESS POINTS IN WIRELESS-SIGNAL-VARIATION-BASED PHYSICAL INTRUDER DETECTION SYSTEMS

(71) Applicant: Symantec Corporation, Mountain View, CA (US)

(72) Inventors: Anand Kashyap, Mountain View, CA (US); Yongjie Cai, Mountain View, CA (US); Qiyan Wang, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/585,737

(22) Filed: Dec. 30, 2014

(51) Int. Cl.
  *G08B 13/00* (2006.01)
  *G08B 13/24* (2006.01)
  *H04B 17/20* (2015.01)
  *H04W 88/08* (2009.01)

(52) U.S. Cl.
  CPC ............ *G08B 13/2491* (2013.01); *H04B 17/20* (2015.01); *H04W 88/08* (2013.01)

(58) Field of Classification Search
  CPC .......................... H04W 88/08; G08B 13/2491
  USPC .............. 340/541, 539.21, 545.2, 545.3, 552, 340/561, 565
  See application file for complete search history.

(56) References Cited

U.S. PATENT DOCUMENTS

| | | | | |
|---|---|---|---|---|
| 7,295,109 | B2 * | 11/2007 | Kobayashi | G08B 13/1966 340/539.21 |
| 2005/0037733 | A1 * | 2/2005 | Coleman | H04B 7/086 455/411 |
| 2005/0055568 | A1 * | 3/2005 | Agrawala | G07C 9/00111 726/2 |
| 2013/0107023 | A1 * | 5/2013 | Tanaka | H04B 5/0037 348/51 |

* cited by examiner

*Primary Examiner* — Phung Nguyen
(74) *Attorney, Agent, or Firm* — Womble Carlyle Sandridge & Rice LLP

(57) ABSTRACT

A method for intruder detection is provided. The method includes monitoring, at a wireless sniffer in a building, received signal strength relative to each of a plurality of wireless access points, wherein a first wireless access point of the plurality of wireless access points is located within the building and a second wireless access point of the plurality of wireless access points is located external to the building. The method includes creating a profile of the received signal strength from each of the plurality of wireless access points, during a learn mode and comparing activity of the received signal strength from each of the plurality of wireless access points to the profile, during an intruder detection mode. The method includes issuing a notification, based on the comparing. An intruder detection system is also provided.

20 Claims, 5 Drawing Sheets

US 9,378,634 B1

LEVERAGING NEIGHBORS' WIRELESS ACCESS POINTS IN WIRELESS-SIGNAL-VARIATION-BASED PHYSICAL INTRUDER DETECTION SYSTEMS

BACKGROUND

Intruder detection systems often require installation of specialized equipment and wiring, including various sensors and power supplies. Sensors for intruder detection systems generally fall in two major categories. A first category is hardwired sensors, such as window switches, door switches and floor pads. A second category is area-based noncontact sensors, such as ultrasound transceivers and infrared detectors. Each category of sensors has advantages and disadvantages. The installation process for an intruder detection system may be expensive to a user and disruptive to the home or business environment. Further, professional burglars may be able to defeat known, familiar sensor and wiring installations.

It is within this context that the embodiments arise.

SUMMARY

In some embodiments, a method for intruder detection is provided. The method includes monitoring, at a wireless sniffer in a building, received signal strength relative to each of a plurality of wireless access points, wherein a first wireless access point of the plurality of wireless access points is located within the building and a second wireless access point of the plurality of wireless access points is located external to the building. The method includes creating a profile of the received signal strength from each of the plurality of wireless access points, during a learn mode and comparing activity of the received signal strength from each of the plurality of wireless access points to the profile, during an intruder detection mode. The method includes issuing a notification, based on the comparing, wherein at least one step of the method is performed by a processor.

In some embodiments, a tangible, non-transitory, computer-readable media having instructions thereupon which, when executed by a processor, cause the processor to perform a method is provided. The method includes forming an activity profile based on received signal strength relating to each of a plurality of wireless access points as determined, during a training mode, at a wireless sniffer in a building, wherein a first wireless access point of the plurality of wireless access points is internal to the building and a second wireless access point of the plurality of wireless access points is external to the building. The method includes monitoring the received signal strength in an intruder detection mode, detecting a physical intruder, based on the activity profile and the monitoring in the intruder detection mode, and producing an alert, responsive to the detecting.

In some embodiments, an intruder detection system is provided. The system includes a wireless sniffer, configured to indicate a received signal strength and a memory, configured to store at least one profile. The system includes an alert module, configured to issue an alert responsive to being triggered and an analytics module. The analytics module is configured to generate or update the at least one profile, based on the received signal strength of each of a plurality of wireless access points as monitored during a learn mode, and is further configured to trigger the alert module responsive to detection of an intruder based on comparison of the at least one profile and the received signal strength of two or more of the plurality of wireless access points during an intruder detection mode.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

An intruder detection system and related method are herein described. The intruder detection system makes use of a wireless sniffer, specially configured to monitor activity of received signal strength of signals from multiple wireless access points. The system develops a profile of such signal strength activity during a learn mode, and compares activity of the received signal strength to the profile during an intruder detection mode. In some embodiments, the profile is built from wireless signals emitted by multiple wireless access points typically present in the environment. One scenario involves a wireless access point in the same house or office (i.e., building) as the sniffer, and one or more wireless access points in other houses or buildings nearby. When the activity of the received radio signal strength deviates from the profile, the system generates an alert, which can be in the form of a posting to a server, a text message sent to a user device, a notification to an agency, or other alarm. Training, indication of a false alarm, and further learning are applied by the system to modify the profile, so that accuracy of intruder detection is improved.

Figure 1:
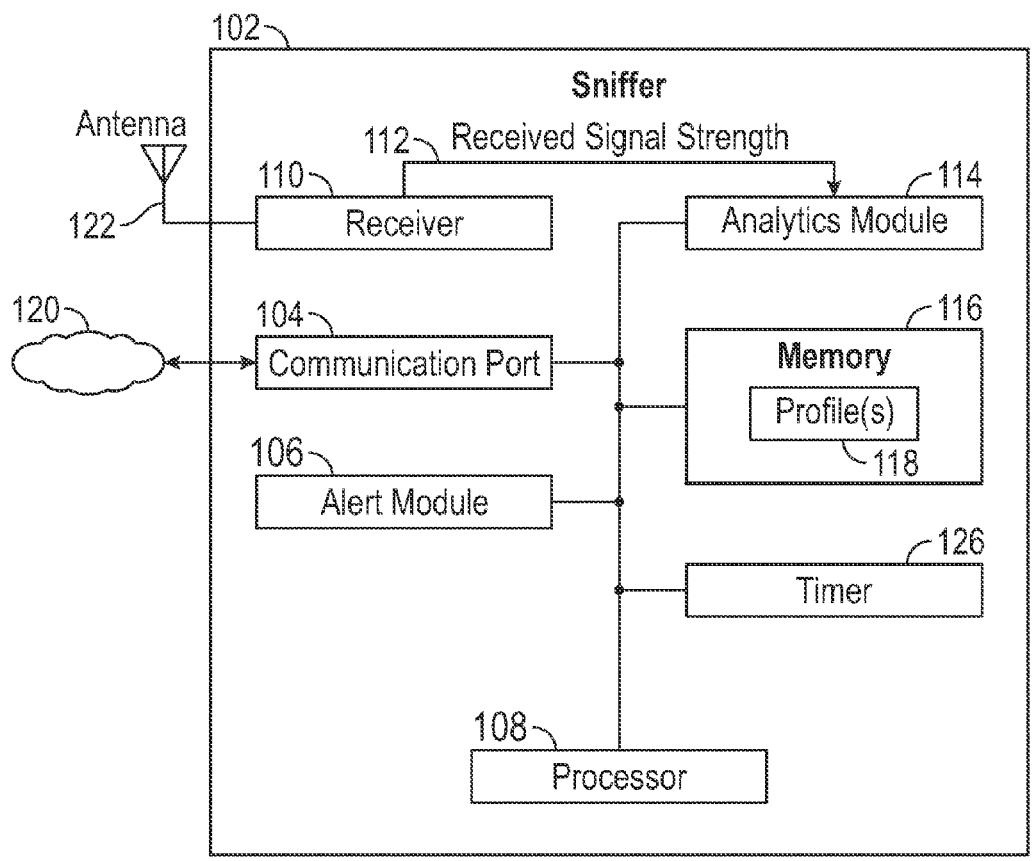
FIG. 1 is a system diagram of a wireless sniffer configured for intruder detection, in accordance with some embodiments.

FIG. 1 is a system diagram of a wireless sniffer 102 configured for intruder detection, in accordance with an embodiment of the present disclosure. Embodiments of the wireless sniffer 102 can be created by adding programming and/or specialized components to a standard wireless module of a computing device, e.g., a personal computer or peripheral with wireless capability, as used in a home or business, or can be created by implementing a wireless sniffer with specialized programming and/or components anew. Generally, a wireless sniffer is a type of network analyzer or packet sniffer for wireless networks, and includes software and/or hardware to intercept or capture network traffic. In some embodiments, the wireless sniffer 102 is specialized by the addition of an analytics module 114 and other components as discussed in various embodiments below.

Figure 2:
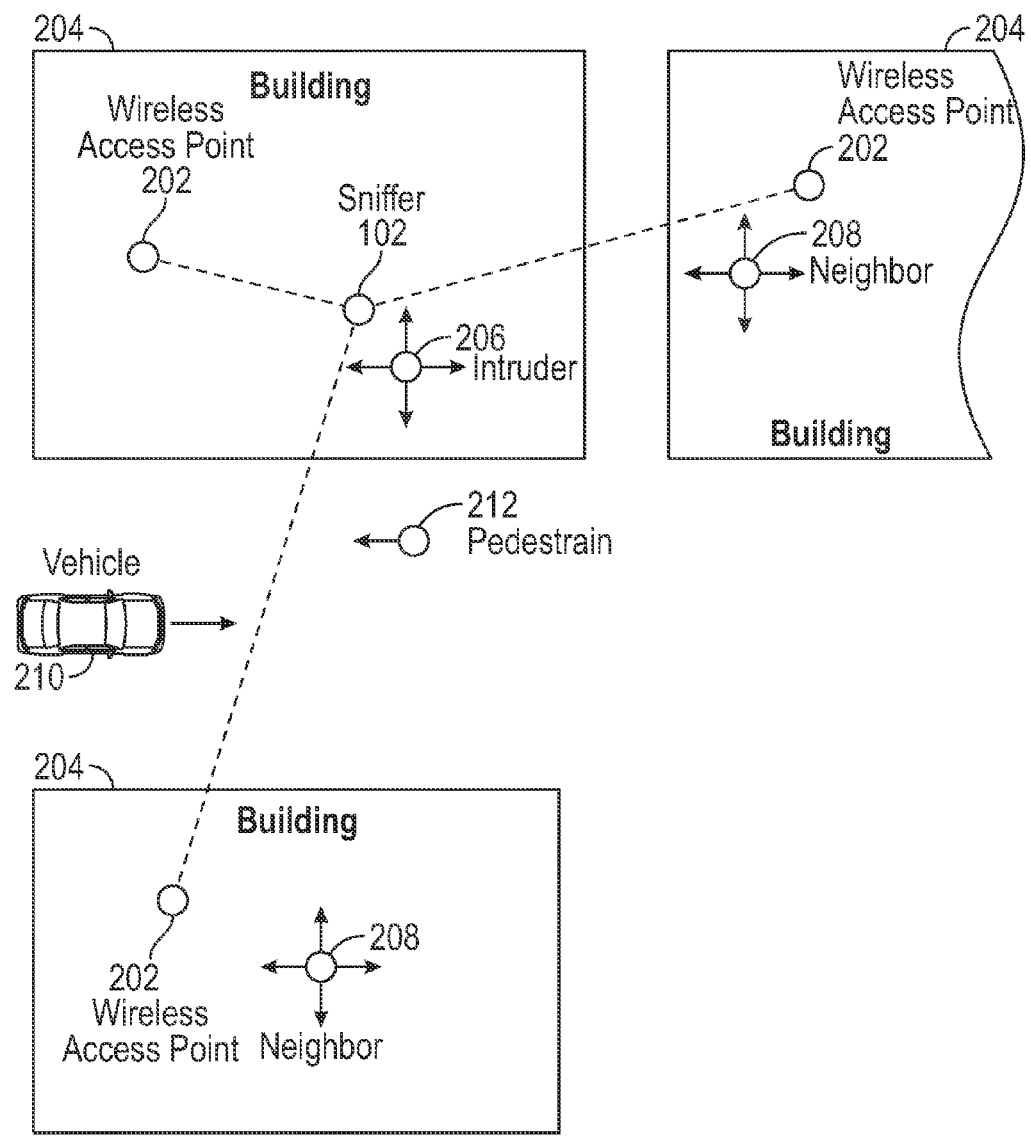
FIG. 2 is a scenario diagram, showing the wireless sniffer of FIG. 1 detecting an intruder in a building in accordance with some embodiments.

Receiver 110 of the wireless sniffer 102 of FIG. 1 is connected to an antenna 122, and receives signals and messages from wireless routers nearby (see FIG. 2 for an operating scenario). The receiver 110 determines the received signal strength (RSS) 112 as signals or messages are received from a wireless router and sends the received signal strength 112 to the analytics module 114. The received signal strength 112 could be in the form of an analog signal, such as a variable voltage expressed on a signal line, or a digital signal, such as a digitized parameter value sent on a bus or other communication path. Received signal strength 112 is a parameter or signal commonly available in other wireless sniffers, and is determined herein in a manner well known in the art. For example, the industry standard RSSI (received signal strength indicator) or the industry standard RCPI (received channel power indicator), or other indication of signal strength could be used, or another signal, data or device could be applied.

Still referring to FIG. 1, the analytics module 114 monitors or tracks the received signal strength 112 of each of multiple wireless access points, distinguishing among the multiple wireless access points by monitoring beacon messages from the wireless access points. A wireless access point generally sends out a beacon message periodically, identifying itself, in order to make its presence known to devices which may attempt to connect to the wireless access point. Present embodiments of the wireless sniffer 102 make use of this feature of wireless access points, without need of replying to a wireless access point. The wireless sniffer 102 can thus determine which wireless access point is associated with which received signal strength 112.

During a learning mode or training mode, the analytics module 114 generates or modifies one or more profiles 118, which are stored in the memory 116 of FIG. 1. In some embodiments, the profile is built from wireless signals emitted by multiple wireless access points typically present in the environment. The analytics module 114 then looks for inconsistencies in the signal strength of the received wireless signal as compared to the profiles 118. Portions, or the entirety of the analytics module 114, could be implemented as software executing on a processor 108, which could be a processor that is further used in other aspects of the wireless sniffer 102 and/or shared with other processing functions in a computer, or could be a processor dedicated to the analytics functions. Portions of the analytics module 114 could be implemented in hardware, firmware, software, or combinations thereof. It should be appreciated that a processor may refer to a programmable logic device or a microprocessor in some embodiments.

When the analytics module 114 detects an intruder, as will be further described below with reference to FIG. 2, the analytics module 114 triggers the alert module 106 of the wireless sniffer 102. The alert module 106 then issues a notification. The notification could be in the form of a visual notification, such as lighting a lamp, an audible notification, such as issuing an alarm sound, or sending a message or other notification out via the communication port 104 to the network 120, e.g., to a destination device or agency as will be further discussed with reference to FIG. 3. Some embodiments of the wireless sniffer 102 have one or more input devices 124, such as buttons, switches, a touchscreen, an input port, and so on. An input device 124, in such embodiments, can be used to activate learn mode, deactivate learn mode, activate intruder detection mode, deactivate intruder detection mode, initiate a delayed activation of intruder detection mode, and/or perform, initiate or terminate other functions in response to a user request.

Some embodiments of the wireless sniffer 102 of FIG. 1 include a timer 126. The timer 126 is applied to timing intervals while monitoring the received signal strength. The timer could thus be applied during a training or learning mode, in order to gauge time lengths and apply these to the profile 118. The timer 126 could be applied during intruder detection mode, in order to gauge a time length of an activity of the received signal strength, such as an anomaly or a spacing between anomalies, for comparison with the profiles 118. Alternatively, the timer 126 could be applied to starting and stopping, e.g., scheduling, the intruder detection mode, or any of the other modes.

FIG. 2 is a scenario diagram, showing the wireless sniffer 102 of FIG. 1 detecting an intruder 206 in a building 204 such as a house or business, or other locale. A distinction is herein made between detecting a physical intruder 206, versus detecting an electronic intruder such as a hacker, which can be addressed by other systems. In the embodiments, the wireless sniffer 102 is operating in a monitoring mode, passively listening to wireless traffic such as Wi-Fi traffic based on Institute of Electrical and Electronics Engineers' (IEEE) 802.11 standards. The wireless sniffer 102 can receive Wi-Fi packets in this mode, and record received signal strength values. In this manner, the wireless sniffer 102 can build a profile 118 of the local environment over a period of time. In some embodiments, the profile is built from wireless signals emitted by several wireless access points 202 typically present in the environment. The profile 118 developed by wireless sniffer 102 is generally stable unless there is a change in the radio environment. The radio environment could change during a period of observation as a result of a neighbor 208 switching on and off a wireless access point 202 belonging to that neighbor 208, thus causing an abrupt change in received signal strength 112 associated with that wireless access point 202. Alternatively, there could be a change in the local environment which affects the received signal strength of wireless access points 202. An unpredictable change in the radio frequency (RF) environment of the wireless sniffer 102, i.e., an anomaly as compared to the profile 118, could indicate a possible home intrusion. In the example of operation of the wireless sniffer 102 shown in FIG. 2, the intruder 206 is moving (indicated by arrows). If the intruder 206 passes between the wireless sniffer 102 and one of the wireless access points 202, the wireless sniffer 102 detects a change in the received signal strength 112 associated with that wireless access point 202.

The embodiments address false alarms as discussed herein. A neighbor 208, moving in another building 204 (e.g., the home or office occupied by the neighbor 208) can pass between a wireless access point 202 in that neighbor's building 204 and the wireless sniffer 102 in the first building 204. This movement causes an anomaly in the received signal strength associated with that wireless access point 202. An automobile or other vehicle 210 driving past the first building 204, or a pedestrian 212 walking past, could cause a similar anomaly, by passing between the wireless sniffer 102 in the first building 204 and another wireless access point 202 in another building 204. To account for false alarms, and respond preferentially to anomalies that are most likely to be caused by an intruder 206, the analytics module 114 could employ various algorithms and heuristics, in some embodiments. The analytics module 114, in cooperation with the receiver 110, can determine which received signal strength 112 value is associated with which wireless access point 202, by tracking the beacon messages of the wireless access points 202 (which have identifier information therein). During the learning mode or training mode, the user could turn the wireless access point 202 in the same building 204 as the wireless sniffer 102 on and off so that the wireless sniffer 102 learns which wireless access point 202 is considered local to that building 204. Then, if an anomaly in the received signal strength 112 associated with the wireless access point 202 in the same building 204 as the wireless sniffer 102 is detected during intruder detection mode, this could indicate an intruder 206. However, if an anomaly in the received signal strength 112 associated with the wireless access point 202 of another building 204 is detected, and no anomaly is detected in the received signal strength 112 associated with the wireless access point 202 in the same building 204 as the wireless sniffer 102, within a predetermined time span, this supposed alarm can be ignored. Such an anomaly may likely be due to a neighbor 208, a vehicle 210 or a pedestrian 212. If two or more anomalous events are detected in received signal strengths 112 associated with wireless access points 202 in other buildings 204, this could be considered an anomaly event in some embodiments. An alert could then be sent upon seeing two anomaly events within a predetermined time span. Various further combinations of anomaly events, time spans for an anomaly or between anomalies, and rules or algorithms regarding same, can be applied to determination of likely presence of an intruder 206 in the same building 204 as the wireless sniffer 102. Some embodiments employ a voting system.

The wireless sniffer 102, and more specifically the analytics module 114, can develop the profile or profiles 118 during a learn mode or training mode over a specified span of time. If there is a false alarm, such as when activity of the received signal strength falls outside the profile 118 during an intruder detection mode but a user later indicates this was a false alarm, the analytics module 114 can update or modify the profile 118 based on the new learning. For example, a user could receive a notification to a cell phone, and send back a command or message that this is a false alarm, as the user recalls that relatives or friends are visiting. Alternatively, the user could review a history, and indicate that certain events were false alarms, e.g., via a graphical user interface (GUI). In addition, the wireless sniffer 102 could monitor activity of the received signal strength 112 when not in training mode and not in intruder detection mode, and learn about various events and patterns of activity such as the vehicle 210 driving by, pedestrians 212 walking past the house, or pets, etc. A user could invoke training mode, and walk around inside the building 204 so that the analytics module 114 can develop a profile 118 indicative of a human moving within a detection zone of the wireless sniffer 102. A profile 118 developed from such training could include a time-based profile of a range of activity of the received signal strength 112 in some embodiments. The profile 118 thus establishes a threshold for detection of human presence within the detection zone.

Figure 3:
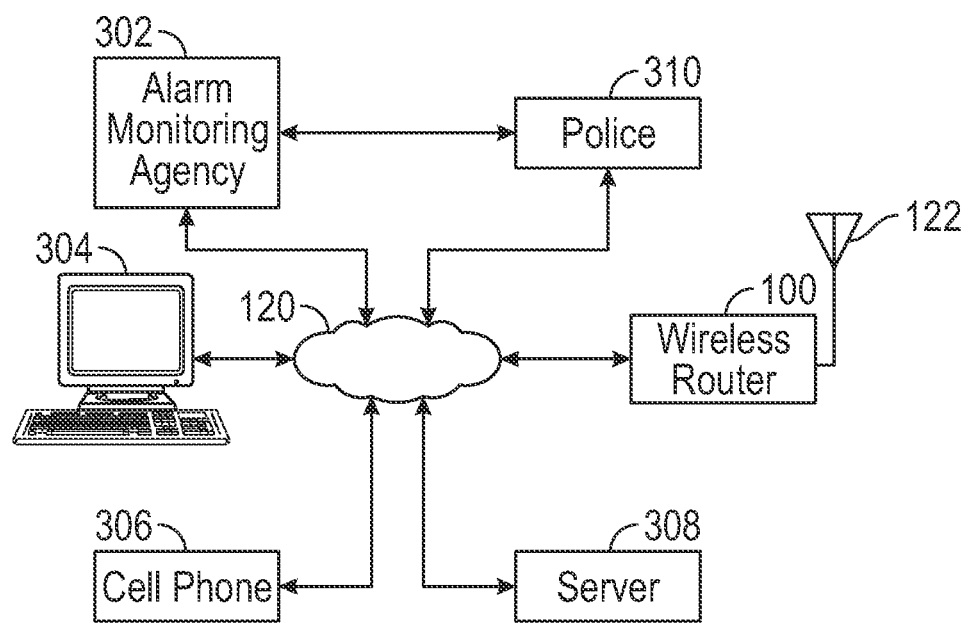
FIG. 3 is a system diagram, showing the wireless sniffer of FIG. 1 coupled to a network and various devices in accordance with some embodiments.

FIG. 3 is a system diagram, showing the wireless sniffer 102 of FIG. 1 coupled to a network 120 and various devices 304, 306, 308. As discussed above, the wireless sniffer 102, and more specifically the alert module 106, could send a notification via the communication port 104 to the network 120. The notification could have an address of a server 308, so that the notification can be posted on the server 308. In some embodiments, the server 308 could act on receiving such a notification, and send a text message to a cell phone 306, an email to a computing device 304, a text message, a digitized or synthesized voice message, a document or other notification to an alarm monitoring agency 302 or the police 310, or otherwise send alerts or notifications. In some embodiments, the wireless sniffer 102 can send such notifications directly to the cell phone 306, the computing device 304, the alarm monitoring agency 302 or police 310, or elsewhere. In some embodiments, a user could couple to the server 308, using a cell phone 306 via the network 120, in order to receive or check for an intruder alert per the notification from the alert module 106. For example, the alert module 106 could send a notification to the server 308, via the network 120. The server 308 could then send a text message via the network 120 to the cell phone 306. A user of the cell phone 306 could then couple via the network 120 to the server 308, to verify or obtain further details about the notification. In further examples, the server 308 or the wireless sniffer 102 could broadcast the notification to multiple destinations. It should be appreciated that server 308 may be a backend server of the assignee in some embodiments.

In one embodiment, the wireless sniffer 102 is integrated with the computing device 304. In one embodiment, the wireless sniffer 102 is integrated with a wireless router. In one embodiment, the wireless sniffer 102 is integrated with a wireless device that couples to the wireless access point 202, such as a printer or other peripheral with wireless capability. Various further embodiments and wireless devices, and variations of the scenario depicted in FIG. 3, are readily devised.

Figure 4:
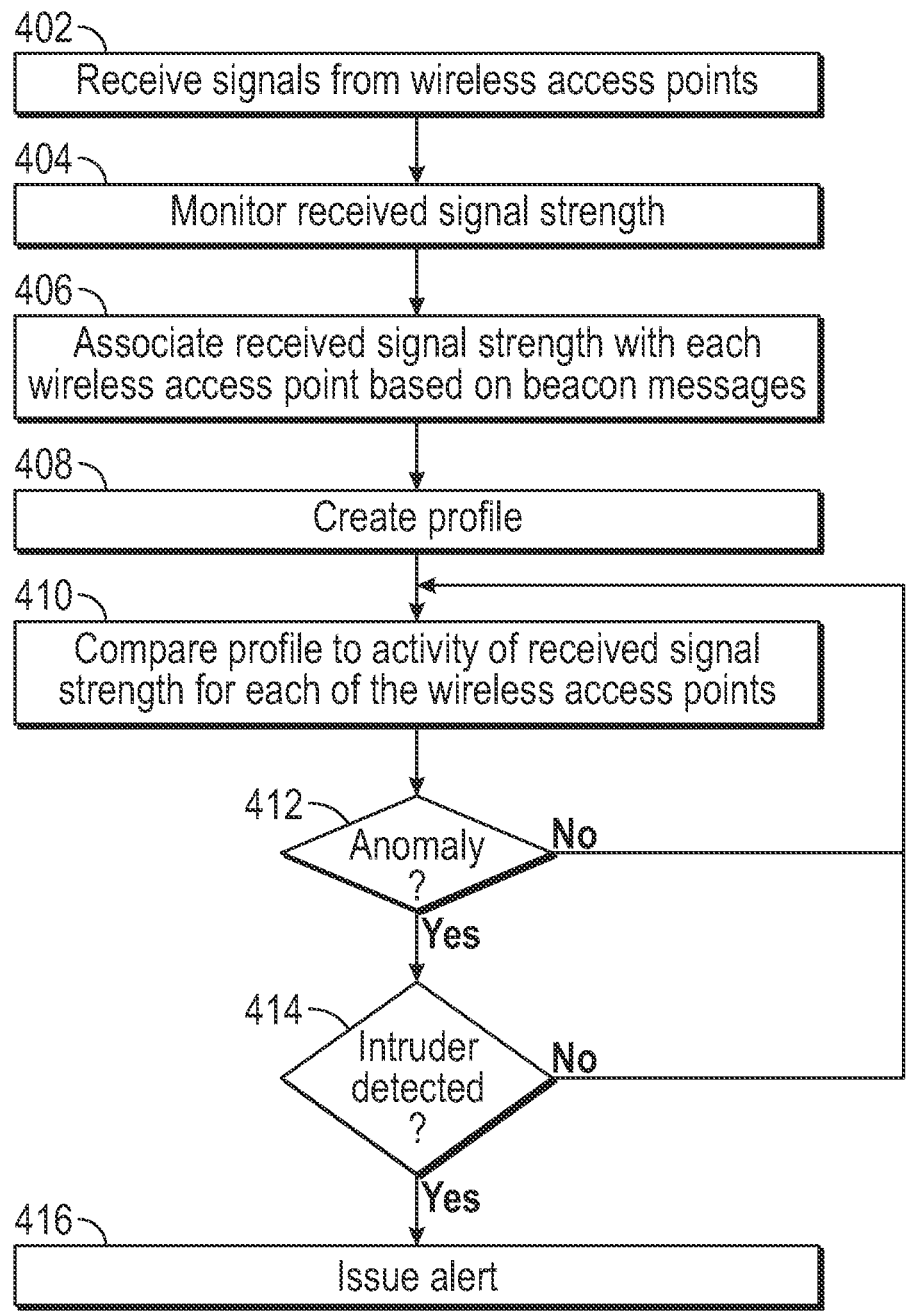
FIG. 4 is a flow diagram, showing a method of detecting an intruder, which can be practiced on embodiments of the specially configured wireless sniffer of FIG. 1 in accordance with some embodiments.

FIG. 4 is a flow diagram, showing a method of detecting an intruder, which can be practiced on embodiments of the specially configured wireless sniffer of FIG. 1 in accordance with some embodiments. A processor, such as a processor in a computing device, a wireless device or a specially configured wireless sniffer can perform actions of the method. In an action 402, signals from wireless access points are received, e.g., by a wireless sniffer. Preferably, one of the wireless access points is in the same building as the wireless sniffer, and one or more of the wireless access points is external to the building, e.g., in an adjacent or nearby building or buildings. Received signal strength is monitored, in an action 404. For example, the wireless sniffer could apply the industry standard RSSI or RCPI, and the processor could store sample values of this in memory, for each of the wireless access points.

The received signal strength is associated with each wireless access point, based on beacon messages, in an action 406 of FIG. 4. Wireless access points typically send beacon messages, each of which has identification information to identify the wireless access point. The processor in or coupled to the wireless sniffer could extract this identification information and store the information with the samples of the received signal strength, for each of the wireless access points. A profile is created, in an action 408. For example, the processor could determine average values and ranges of received signal strength for each of the wireless access points, and determine times of day when each of the wireless access points is active, storing this as a profile. Generally, the profile would be created during a learn mode, and could be updated in cases of false alarms and/or during times when intruder detection mode is not set. The profile is compared to activity of received signal strength for each of the wireless access points, in an action 410. Generally, this comparison would happen during intruder detection mode, and the processor should be looking for anomalies, e.g., values of received signal strength that are outside of the stable or average values or ranges in the profile.

In a decision action 412 of FIG. 4, it is determined whether there is an anomaly in the received signal strength. If there is no anomaly, flow branches back to the action 410 to continue monitoring received signal strength and comparing activity of received signal strength to the profile. If there is an anomaly, flow proceeds to the decision action 414. In the decision action 414, it is determined whether there is an intruder detected. For example, one or more of the algorithms described above for rejecting false alarms and/or determining a likely intruder event could be applied. If the answer is no, there is no intruder detected, flow branches back to the action 410 to continue monitoring received signal strength and comparing activity of received signal strength to the profile. If the answer is yes, flow proceeds to the action 416, in which an alert is issued. This could take the form of sending a message to a cell phone, a server, an agency or an authority, and/or sounding an alarm or lighting a lamp, etc. In variations of the method shown in FIG. 4, learning mode or intruder detection mode could be activated or deactivated via user input, schedule, etc., false alarms could be declared by a user input, the profile could be updated, and so on. Further variations of the method are readily devised in accordance with the teachings herein.

Figure 5:
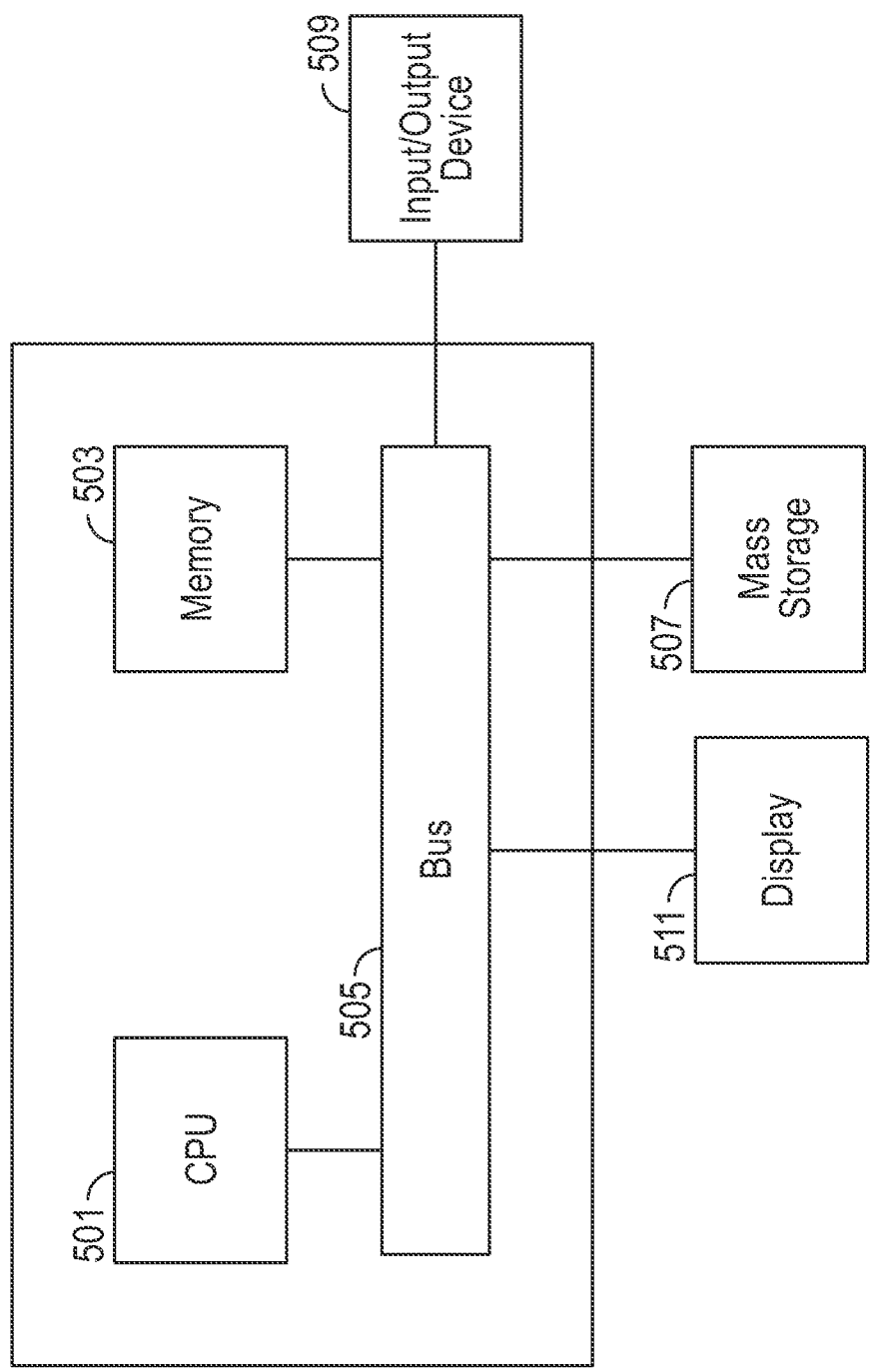
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for analytics, alerts, signal strength monitoring, profile development and modification, and other functions in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be iOS™, MS-WINDOWS™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. In addition, the embodiments described herein may be stand-alone products or may be integrated into software and/or hardware products of the assignee.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for intruder detection, comprising:
   monitoring, at a wireless sniffer in a building, received signal strength relative to each of a plurality of wireless access points, wherein a first wireless access point of the plurality of wireless access points is located within the building and a second wireless access point of the plurality of wireless access points is located external to the building;
   creating a profile of the received signal strength from each of the plurality of wireless access points, during a learn mode;
   comparing activity of the received signal strength from each of the plurality of wireless access points to the profile, during an intruder detection mode; and
   issuing a notification, based on the comparing, wherein at least one step of the method is performed by a processor.

2. The method of claim 1, further comprising:
   denoting in a memory an anomaly event, responsive to an anomaly in the received signal strength relative to the first wireless access point.

3. The method of claim 1, further comprising:
   denoting in a memory an anomaly event, responsive to an anomaly in the received signal strength relative to the second wireless access point and an anomaly in the received signal strength relative to a third wireless access point located external to the building.

4. The method of claim 1, wherein issuing the notification is further based on two anomaly events in the activity of the received signal strength in a specified time interval.

5. The method of claim 1, wherein issuing the notification comprises sending an alert, via a network, to a server or a user device.

6. The method of claim 1, wherein the comparing comprises analyzing the received signal strength relative to each of the plurality of wireless access points as to anomaly in comparison with the profile.

7. The method of claim 1, wherein the monitoring comprises distinguishing the received signal strength relative to each of the plurality of wireless access points according to beacon messages from the plurality of wireless access points.

8. A tangible, non-transitory, computer-readable media having instructions thereupon which, when executed by a processor, cause the processor to perform a method comprising:
   forming an activity profile based on received signal strength relating to each of a plurality of wireless access points as determined, during a training mode, at a wireless sniffer in a building, wherein a first wireless access point of the plurality of wireless access points is internal to the building and a second wireless access point of the plurality of wireless access points is external to the building;
   monitoring the received signal strength in an intruder detection mode;

detecting a physical intruder, based on the activity profile and the monitoring in the intruder detection mode; and producing an alert, responsive to the detecting.

9. The computer-readable media of claim 8, wherein the method further comprises:
   determining a first anomaly event, responsive to an anomaly in the received signal strength relative to the first wireless access point; and
   determining a second anomaly event, responsive to an anomaly in the received signal strength relative to the second wireless access point and a further anomaly in the received signal strength relative to a third wireless access point that is external to the building, wherein detecting the physical intruder and producing the alert is responsive to determining the first anomaly event and determining the second anomaly event.

10. The computer-readable media of claim 8, wherein producing the alert comprises sending the alert as a message, via a network.

11. The computer-readable media of claim 8, wherein the method further comprises:
   determining the received signal strength relating to each of the plurality of wireless access points, based on beacon messages transmitted by the plurality of wireless access points.

12. The computer-readable media of claim 8, wherein forming the activity profile includes establishing a threshold for detection of human presence, based on the received signal strength.

13. The computer-readable media of claim 8, wherein monitoring the received signal strength comprises:
   associating a value of the received signal strength to each of the plurality of wireless access points based on information in beacon messages transmitted by the plurality of wireless access points.

14. An intruder detection system, comprising:
   a wireless sniffer, configured to indicate a received signal strength;
   a memory, configured to store at least one profile;
   an alert module, configured to issue an alert responsive to being triggered; and
   an analytics module, configured to generate or update the at least one profile, based on the received signal strength of each of a plurality of wireless access points as monitored during a learn mode, and further configured to trigger the alert module responsive to detection of an intruder based on comparison of the at least one profile and the received signal strength of two or more of the plurality of wireless access points during an intruder detection mode.

15. The intruder detection system of claim 14, wherein the two or more of the plurality of wireless access points includes an access point internal to a building housing the wireless sniffer and a further access point external to the building housing the wireless sniffer.

16. The intruder detection system of claim 14, wherein the analytics module is configured to trigger the alert module responsive to a determination of a first anomaly in the received signal strength of one of the plurality of wireless access points internal to a building housing the wireless sniffer, determination of a second anomaly in the received signal strength of one or more of the plurality of wireless access points external to the building, and determination of a third anomaly in the received signal strength of the one or more of the plurality of wireless access points external to the building.

17. The intruder detection system of claim 14, further comprising:
   a communication port, configured to send the alert via a wired or wireless network.

18. The intruder detection system of claim 14, further comprising:
   a timer, configured to time a duration of an anomaly of the received signal strength and time a spacing between anomalies of the received signal strength, wherein the detection of the intruder is further based on a result from the timer.

19. The intruder detection system of claim 14, wherein the memory, the alert module and the analytics module are included in a computing device having a processor, and wherein the wireless sniffer is included in a wireless module of the computing device.

20. The intruder detection system of claim 14, further comprising:
   a communication port; and
   the alert module configured to send the alert, via the communication port, to one of a server, a mobile communication device, an authority, or an agency.

* * * * *